(12) United States Patent
Neal et al.

(10) Patent No.: US 6,376,819 B1
(45) Date of Patent: Apr. 23, 2002

(54) SUB-LENS SPATIAL RESOLUTION SHACK-HARTMANN WAVEFRONT SENSING

(75) Inventors: Daniel R. Neal, Albuquerque, NM (US); Justin D. Mansell, Palo Alto, CA (US)

(73) Assignee: WaveFront Sciences, Inc., Albuquerque, NM (US)

( * ) Notice: Subject to any disclaimer, the term of this patent is extended or adjusted under 35 U.S.C. 154(b) by 0 days.

(21) Appl. No.: 09/612,222

(22) Filed: Jul. 7, 2000

Related U.S. Application Data

(60) Provisional application No. 60/142,919, filed on Jul. 9, 1999.

(51) Int. Cl.[7] .................................................. G01J 1/20
(52) U.S. Cl. ..................................... 250/201.9; 356/121
(58) Field of Search ........................ 250/201.9; 356/121, 356/237.1, 600

(56) References Cited

U.S. PATENT DOCUMENTS

| | | | | |
|---|---|---|---|---|
| 4,666,298 A | * | 5/1987 | Protz | 356/121 |
| 4,737,621 A | * | 4/1988 | Gonsiorowski et al. | 250/201.9 |
| 5,083,015 A | * | 1/1992 | Witthoft et al. | 250/201.9 |
| 5,164,578 A | * | 11/1992 | Witthoft et al. | 250/201.9 |
| 5,166,508 A | * | 11/1992 | Davis et al. | 250/201.9 |
| 5,233,174 A | | 8/1993 | Zmek | 250/201.9 |
| 5,493,391 A | * | 2/1996 | Neal et al. | 356/121 |
| 5,563,709 A | | 10/1996 | Poultney | 356/371 |
| 5,629,765 A | * | 5/1997 | Schmutz | 356/121 |
| 5,864,381 A | | 1/1999 | Neal et al. | 351/205 |
| 5,912,731 A | * | 6/1999 | Delong et al. | 356/121 |
| 5,936,720 A | * | 8/1999 | Neal et al. | 356/121 |
| 6,052,180 A | * | 4/2000 | Neal et al. | 356/121 |
| 6,057,913 A | * | 5/2000 | Brown et al. | 356/121 |
| 6,163,381 A | * | 12/2000 | Davies et al. | 356/521 |
| 6,184,974 B1 | * | 2/2001 | Neal et al. | 356/121 |

\* cited by examiner

*Primary Examiner*—Robert H. Kim
*Assistant Examiner*—Allen C. Ho
(74) *Attorney, Agent, or Firm*—Volentine Francos, PLLC

(57) ABSTRACT

The spatial resolution of Hartmann-type sensors can be increased by moving a wavefront being sensed relative to the sensor by a non-integral number of apertures. The apertures may have a tilt on at least one side thereof. The lenslets themselves in a lenslet array may serve as the apertures or material may be provided on the lenslet array to create the apertures.

18 Claims, 3 Drawing Sheets

SQUARE

ONE TILTED SIDE

TWO TILTED SIDE

SUB-LENS SPATIAL RESOLUTION SHACK-HARTMANN WAVEFRONT SENSING

CROSS-REFERENCE TO RELATED APPLICATIONS

This application claims priority under 35 U.S.C. 119 to provisional application No. 60/142,919 filed Jul. 9, 1999, the entire contents of which are hereby incorporated by reference for all purposes.

BACKGROUND OF THE INVENTION

1. Field of the Invention

The present invention is directed to increasing spatial resolution of Hartmann type wavefront sensors, more particularly to using a hard aperture to limit the wavefront area being sensed.

2. Description of Related Art

Hartmann wavefront sensing began as a technique for optical metrology, but the adoption of the technique by the adaptive optics community changed its primary usage. The adaptive optics community developed high photon efficiency high-speed sensors. Recently Hartmann sensors have been developed to address the needs of optical metrology again. Today most optical metrology is done with interferometry because of the availability of commercial systems and the coupled high dynamic range and high resolution, but improvements to the Hartmann sensor allow it to compete with interferometry for the optical metrology market. Shack-Hartmann wavefront sensor systems are being sold today for approximately one quarter the cost of commercial interferometers. These Shack-Hartmann wavefront sensors have sensitivity comparable to commercial interferometers and offer vibration insensitivity and typically higher dynamic range in a single compact package.

One major drawback of the Shack-Hartmann wavefront sensor is the inherently limited resolution due to the size of the lenses in the lens array. To see features smaller than a lens diameter, the wavefront had to be magnified before entering the sensor with a lens or set of lenses. The disadvantage of this technique is that the magnifying lenses then impose their own aberrations and the field of view of the wavefront sensor is reduced. Magnification of the wavefront reduces the sensor's field of view but allows for higher resolution at the cost of the dynamic range.

Wavefront sensors are also used for metrology applications, as set forth, for example, in U.S. Pat. No. 5,563,709 to Poultney. However, the sensor and the test object were not moved relative to one another, and the sensitivity is limited to the aperture of the sensor. Full object metrology when the object is larger than the aperture of the sensor is set forth in commonly assigned, co-pending application Ser. No. 09/340,502 entitled "Apparatus and Method for Evaluating a Target Larger than a Measuring Aperture of a Sensor" filed Jul. 1, 1999, now U.S. Pat. No. 6,184,974, the entire contents of which are hereby incorporated by reference for all purposes. When the goal is to examine extremely small dimples or defects, e.g., 5 nm, having a small spatial extent, e.g., 1–2 mm, on the surface of a silicon wafer requires a wavefront sensor with sufficient resolution to measure the height, resulting in fairly long focal length lens arrays. However, long focal length lens arrays are also required to be fairly large in diameter. In other words, the diameter or aperture of the sensor needed to detect the extremely small height of the feature is now larger than the spatial extent of the feature, making the feature irresolvable by the sensor. Thus, while a sensitive enough sensor can be made, the spatial resolution has been compromised.

SUMMARY OF THE PRESENT INVENTION

The present invention is therefore directed to a wavefront sensor that substantially overcomes one or more of the problems due to the limitations and disadvantages of the related art.

It is an object of the present invention to create a sensor having both high spatial resolution and good height sensitivity. This combination high spatial resolution and good sensitivity may also enable a variety of other applications such as flat panel display measurement, roll and sheet glass, plastic or metal film measurement, and a variety of other uses.

More particularly, it is an object of the present invention to extract sub-lens features from the wavefront sensor, referred to herein as knife-edge wavefront sensing. The basic idea is to move the wavefront across the lens array in steps that are a fraction of a lens diameter. The hard edges of the lens aperture, like a knife-edge, adjust the section of the wavefront exposed to each lens. The tilt seen by each lens can be determined using centroiding for each of the different positions of the wavefront and the features of the wavefront smaller than a lens can be determined. Thus, in accordance with the present invention, the spatial resolution of the sensor is increased by using the hard aperture of the lens to limit the wavefront being sensed.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

BRIEF DESCRIPTION OF THE DRAWINGS

The foregoing and other objects, aspects and advantages will be described with reference to the drawings, in which.

DETAILED DESCRIPTION OF THE PREFERRED EMBODIMENTS

Each lens in a Shack-Hartmann wavefront sensor measures the tilt seen by that lens by determining the position of the spot at the focus of the lens, typically with a centroid algorithm. This procedure works well if there is an average tilt to the wavefront over the lens.

If the wavefront has features smaller than the lens, they cannot be seen with the Hartmann sensor. However, by moving the sensor relative to the test object by a fraction of a lens, the limits over which the average tilt is performed are changed. The small section of the wavefront being viewed after the sensor moves will be dubbed the new region and the section no longer seen by a given lens will be called the old region. This motion of the sensor will result in a shift in the centroid if there is a difference in tilt between the new region and the old region. This allows for wavefront features to be viewed if they are on the order of the sensor displacement and produce a wavefront tilt shift because of the motion.

Figure 1A:
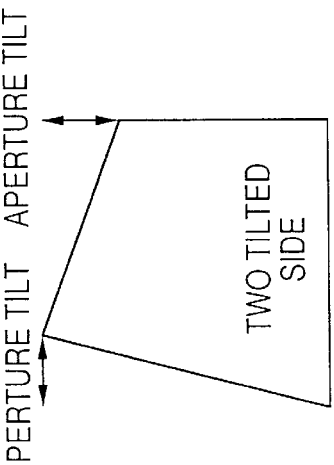
FIGS. 1A–1C illustrate different tilted apertures for knife-edge wavefront sensing.

In one embodiment, the aperture of the lens itself, such as shown in FIG. 1A, may be used to limit the wavefront being viewed. As the lens is translated relative to the wavefront reflected from the test object, the aperture of the lenslet measures a different portion of the wavefront. Since each lenslet measures the average slope over its aperture, variations in this difference lead to a measurement of the wavefront at higher resolution than the lenslet array. For isolated or non-regular features on the test object, these moving averages may be integrated to provide a detailed, high-resolution map of the surface. It is only necessary to scan one lenslet diameter in each direction (x and y), since the lenslet array provides multiple sampling at its own resolution. The net result is a series of images of focal spot patterns that may be analyzed to produce the wavefront. The sequence allows the lenslet resolution measurements to be filled in with the intervening values. Note that the measurements produce wavefront slope information, which may be integrated to produce the wavefront using any number of different wavefront reconstructors. Thus, by moving the wavefront sensor some non-integral number of lenslet will allow resolution of features that are smaller than the aperture of the lenslets.

Figure 1B:
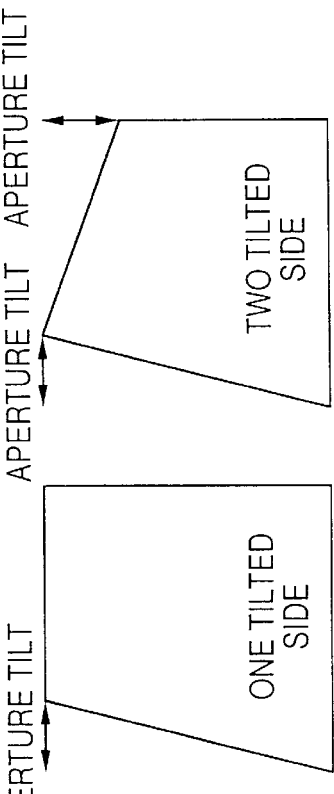
Figure 1C:
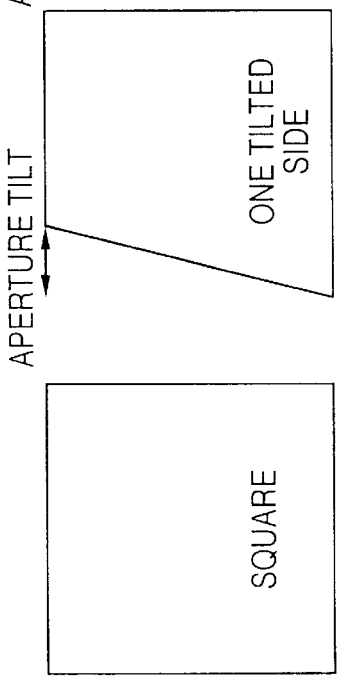

Typically, such non-integral movement alone, using the lenslets themselves as hard apertures, is sufficient to resolve sub-apertute features. However, there are some wavefronts that will not produce a change in the average tilt when using the lenslets as hard apertures even when moved by at non-integral steps. For example, a wavefront consisting of all integer number of sinusoidal periods, e.g., from a diffraction grating, will not produce such a change, since the average tilt induced by this aberration is zero for al averaging window of this size no matter where the start or stop of the averaging is located. Because of this, a break in the spatial frequency of the lenses has to be created, Tilting one or two of the edges of the square aperture of typical Shack-Hartmann lenses, as shown in FIGS. 1B and 1C, respectively, accomplishes this. As can be seen in FIG. 1B, the aperture may be a trapezoid, arid in FIG. 1C, the aperture may be simply a quadrilateral. The quadrilaterals may include rectangles other than squares shown in FIG. 1B. This tilting may take numerous forms, for example, may also result in a diamond shaped aperture. The important feature of the tilt is to break the spatial frequency of the square aperture and the selection of the aperture shape will depend on ease of manufacture. This aperture may be realized by providing a blocking aperture to the square lenslet array or by creating an array of lenslets having the desired aperture shape.

Applying linear optics theory, the efficacy and transfer function of using tilt to resolve sub-aperture features for a highly periodic structure can be determined. Assume that the wavefront shaped by a perfect two-order blazed grating such that the angle of diffraction can be given by Equation (1).

$$\sin \theta = \lambda/\Lambda$$

where $\lambda$ is the wavelength of light and $\Lambda$ is the grating period. The separation of the spots after the lens would be given by Equation (2), $$\Delta x = f \sin \theta$$

where f is the lens focal length if the lens aperture is designed perfectly for the wavefront, the number of grating periods distributed over the lens aperture is an integer plus one half. The amount of light in each order can be approximated by the amount of light covering the piece of the blazed grating diffracting it in each direction. Thus, the intensity in each order is given by Equation (3), $$I_+ = \frac{d - \Lambda/2}{2\Lambda}$$

$$I_- = \frac{d - \Lambda/2}{2\Lambda} + 1$$

where d is the diameter of the lens and $\Lambda$ is the grating period.

Applying this to the centroid or first moment formula, the center of this intensity pattern is given by Equation (4), $$\bar{x} = \frac{\sum I(x, y) \cdot x}{\sum I(x, y)} = \frac{(I_+ - I_-) \cdot \Delta x}{(I_+ + I_-)}$$

Using the paraxial ray approximation (sin $\theta$=tan $\theta$=$\theta$) and assuming that $\Lambda$ is much greater than d, the simplification of Equation (4) leaves Equation (5), $$\bar{x} = \frac{f\lambda}{d}$$

where f is the focal length, $\lambda$ is the wavelength, and d is the diameter. This formula is also commonly known as the spot size of a square lens. The shift in the centroid is actually double this number because as the lens is scanned, the light will oscillate between the two orders. Therefore, the shift in the centroid is exactly the spot diameter of a square lens.

One practical limit of this technique is when the diffracted light diffracts out from behind the lens into the adjacent lens in the array. To determine the maximum grating period, the diffraction angle of light from a grating defined above is set equal to the maximum measurable tilt angle, given by Equation (6)

$$\theta = \tan^{-1}\left(\frac{d - (f\lambda/d)}{2f}\right)$$

Assuming that the spot size is small compared to the lens diameter and using the paraxial ray approximation, the maximum grating period is found to be approximately Equation (7), $$\Lambda_{max} = \frac{2\lambda f}{d}$$

which is equal to the square lens spot diameter. To push the limit of the resolvable grating period, some of the lenses could be masked out to create a lower lens density, but higher grating period resolution.

Thus, using the approximations presented above, the centroid motion and the minimum resolvable grating period will be equal to the spot diameter. To verify this, Fourier transform modeling was performed on a variety of lenses and a variety of apertures with respect to spatial wavelength. The focal plane of a lens with a known hard aperture was modeled while moving the wavefront in the x direction in steps of one tenth of a period. The centroid was performed after pixelating the intensity to a thirty-by-thirty pixel array and digitizing to eight bits. Then the maximum centroid shift was determined as the wavefront was moved.

Figure 2:
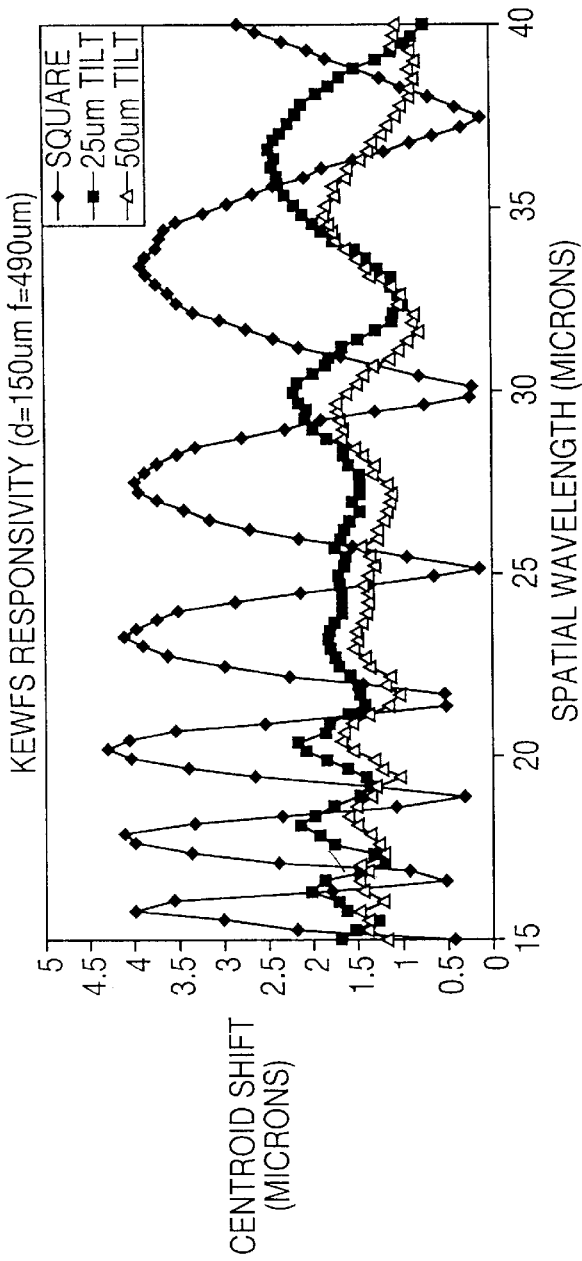
FIG. 2 show the Fourier modeling results for knife-edge wavefront sensing for a wavelength of 633 nm.

FIG. 2 shows a result of this modeling with the centroid response plotted against the spatial frequency of the sinusoidal grating. The square aperture lens, as shown in FIG. 1A, shows the expected spatial frequency resonances, while the lenses with single tilted side or the lenses with double tilted side break the spatial frequency enough to flatten out the peak-to-valley centroid shift. The spot diameter of this square lens for 633 nm light is about 4.1 microns. This appears to be approximately a factor of three higher than the value predicted by the linear optics theory. The discrepancy can be accounted for by the numerous approximations in the theory. The behavior is well predicted by the linear optics theory. Once the appropriate aperture tilt was applied, the response is effectively constant with respect to the spatial wavelength of the diffraction grating.

Microlens arrays were fabricated using standard integrated circuit techniques, e.g., reflowing photoresist, using binary masks or using gray scale masks. The microlenes may be shaped to create the desired apertures or the apertures may be physically applied to the microlenses, e.g., by doing a lift-off of 200 nm of aluminum, thus creating a reflective aperture. When applied to circular microlenses, the apertures in all three embodiments were designed to be squares with sides equal to the diameter times the square root of two such that they fit inside the circular microlenses. Apertures were designed with no aperture tilt, aperture tilt on one side, and aperture tilt on both sides. The aperture tilt for each aperture was one-eighth the circular lens Several different lens arrays were fabricated. The lens diameters were 150 microns, 200 microns, 250 microns, and 300 microns. The sag on all the lenses is approximately the same at 12.5 microns. The focal lengths were then calculated to be 0.49 mm, 0.87 mm, 1.36 mm and 1.96 mm respectively.

Figure 3:
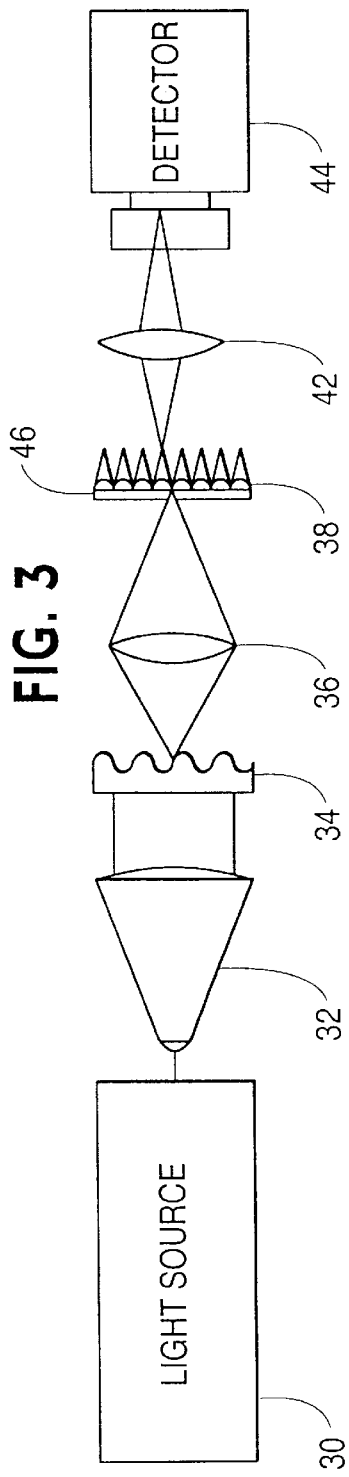
FIG. 3 is a schematic illustration of a system for testing knife-edge wavefront sensing.

Two different test objects were measured using the knife-edge wavefront sensing technique: 600-micron diameter lenses and a 28-micron wavelength diffraction grating. FIG. 3 is a schematic illustration of the experimental setup for these measurements. A light source 30, e.g., a HeNe laser, is expanded by a magnifying system 32 impinges on a test object 34 under measurement. A lens 36 re-images the test object onto the lens array 38. The focal plane of the lens array 38 was re-imaged onto a CCD 44, or other position sensitive detector or array thereof, using a magnifying lens 42. An iris 46 was placed at the focus of the lens 36 to limit the spatial frequency impinging on the lens array and to avoid stray scattered light causing crosstalk. The test object was placed on a three-axis translation stage with motion parallel to the table and normal to the propagation controlled by a micrometer capable of one-micron accuracy.

Figure 4:
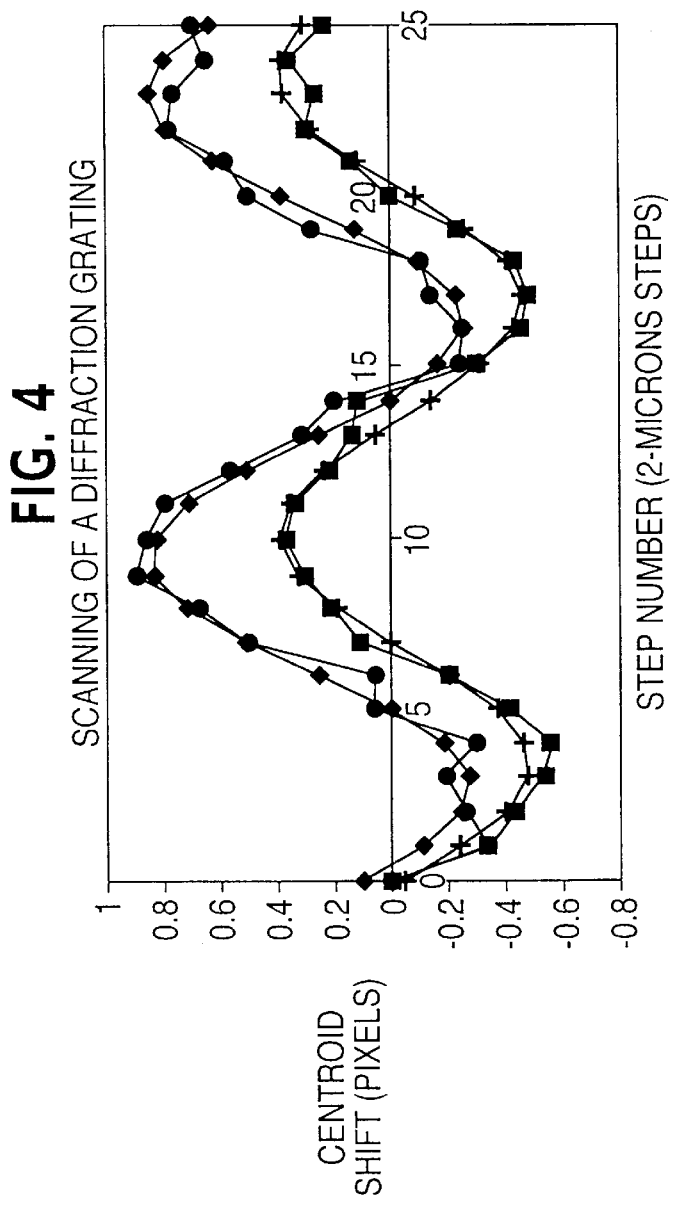
FIG. 4 is a plot from the scanning of a diffraction grating using knife-edge wavefront sensing.

All the measurements made were done with the 150-micron circular diameter lens array 38 that had apertures with two sides tilted thereon. The first test object 34 was a phase-only diffraction grating made using a single photolithographic step and transferred into the glass using a $CF_4$ and $O_2$ plasma etch. The spatial frequency of the binary grating was measured on a profilometer to be about 28 microns. Adjusting the width of iris 46 at the focus of the lens 36 blocked the diffraction beyond the first orders. The grating was then measured with the knife-edge wavefront sensing setup using one-micron steps. The change in the position of the centroid of the focal spots was measured using the CLAS-2D software provided by Wavefront Sciences, Inc. FIG. 4 shows the centroid shift with respect to displacement for two separate lenses and the sinusoidal fits to this data. The sinusoidal fits extracted a spatial wavelength of 27 microns.

Figure 5:
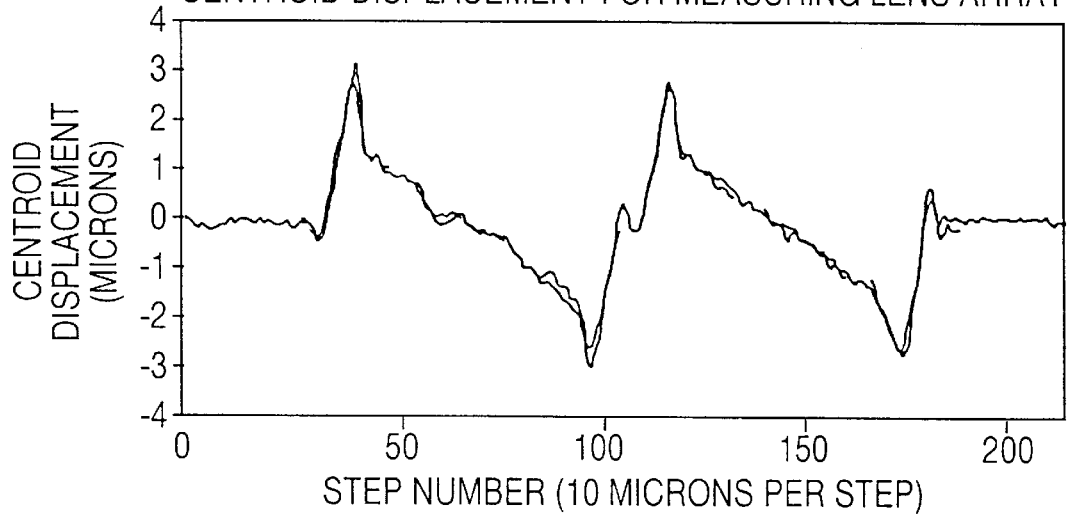
FIG. 5 is a plot of the signal recorded by an array of lenses as a pair of 600-micron diameter lenses separated by 160 microns was translated across the lens array in ten-micron steps.

The next test object 34 measured with the knife-edge wavefront sensing technique was a pair of lenses 600 microns in diameter and 2 microns tall with about 160 microns between them. FIG. 5 shows the displacement of the centroid of the focal spots of six lenses approximately centered on the lens pair as the pair was translated in 10-micron steps across the lens array. Since the wavefront sensor measures the derivative, the expected result of this measurement is a pair of linear changes in the centroid location with respect to displacement. The linear portions of the curve were fit and the results were slopes of −0.0544 and −0.058, and residual squared of 0.97 and 0.99 on the left and right respectively. The sharper features are caused by the edge effects in scanning a circular lens across an almost square aperture. Integration of these linear ramps will produce parabolic lens profiles that closely match the test object shape.

Figure 6:
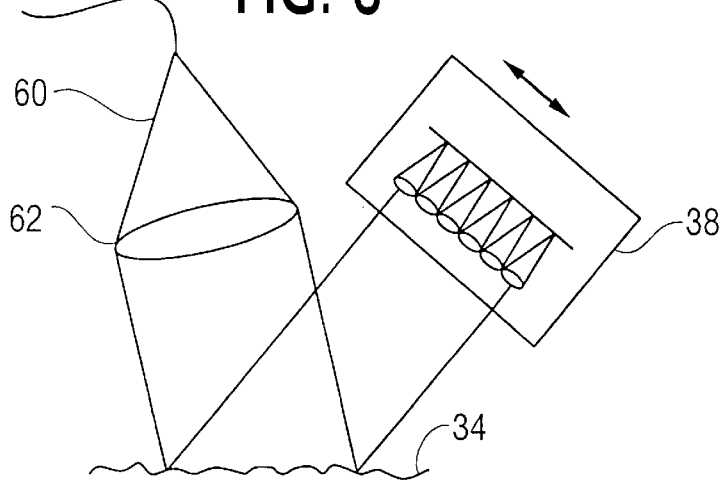
FIG. 6 is a schematic diagram of knife-edge wavefront sensing in a metrology application.

Use of the knife-edge wavefront sensing of the present invention for metrology applications is schematically illustrated in FIG. 6. Here, light 60 front a light source is provided to a lens 62 that directs the light onto the test object 34. Light reflected from the test object 34 is incident on the lenslet array 38. This lenslet array is moved relative to the test object by a non-integral number of lenslets. The output of the lenslet array is provided to a detector in the same manner disclosed regarding FIG. 3.

Thus, knife-edge wavefront sensing in accordance with the present invention allows Shack-Hartmann wavefront sensors to resolve features smaller than the size of an individual lens by moving the sensor in steps across the wavefront that are a non-integral number of apertures. Using linear optics theory, the fundamental limits of this technique have been shown to be the diffraction limit of light. This technique allows for more resolution for applications like optical metrology and laser beam characterization. To determine the surface profile of the test object, a reconstruction method would be applied as in conventional Hartmann wavefront sensing. In many applications, this technique will be particularly useful when combined with other techniques, e.g., the stitching application, to obtain information about an object that is larger than the aperture, but has features smaller than the aperture. The technique, while only demonstrated here in one dimension, is applicable to a two-dimensional scan as well. Further, while the non-integral steps used in the examples were all smaller than the aperture, non-integral steps that are larger than the aperture, e.g., 1.25 times the aperture size, may also be used.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

What is claimed is:

1. A method for improving spatial resolution of a Hartmann-type wavefront sensor comprising:
   a) providing a plurality of apertures;
   b) translating the sensor relative to the wavefront by a non-integral number of apertures; and
   c) determining features of the wavefront smaller than a lens of the lens array according to a shift in location of the focal spots between translatings.

2. The method of claim 1, wherein said translating consists essentially of only moving the wavefront sensor.

3. The method of claim 1, wherein said translating consists essentially of only moving the wavefront.

4. The method of claim 1, wherein said translating comprises moving both the wavefront and the wavefront sensor.

5. The method of claim 1, wherein the apertures are hard apertures.

6. The method of claim 1, wherein said providing comprises forming the plurality of apertures on a lenslet array of the wavefront sensor.

7. The method of claim 1, wherein said providing comprises forming a lenslet array with each lenslet having a desired aperture.

8. A system for enhancing the spatial resolution of a Hartmann-type wavefront sensor comprising:

a) a device for sensing a position of a spot generated by the wavefront sensor;

b) a plurality of apertures; and c) a translator for moving the wavefront sensor relative to a wavefront being measured by a non-integral number of apertures.

9. The system of claim 8, wherein the device for sensing the spot position is a charge-coupled device (CCD).

10. The system of claim 8, wherein the device for sensing the spot position is an array of position sensitive detectors.

11. The system of claim 8, wherein the plurality of apertures comprises an absorbing or reflecting surface with holes therein which allow light to transmit there through.

12. The system of claim 11, wherein the holes are rectangular in shape.

13. The system of claim 11, wherein the holes are trapezoidal in shape.

14. The system of claim 11, wherein the holes are slightly non-rectangular such that the normally parallel sides are tilted at a slight angle.

15. The system of claim 8, wherein the plurality of apertures is an array of lenses having a desired aperture shape.

16. The system of claim 15, wherein the lenses are rectangular.

17. The system of claim 15, wherein the lenses have trapezoidal apertures.

18. The system of claim 15, wherein the lenses are non-rectangular such that at least one pair of normally parallel sides are tilted.

* * * * *